United States Patent [19]
Kadoi et al.

[11] Patent Number: 5,488,084
[45] Date of Patent: Jan. 30, 1996

[54] POLYPHENYLENE SULFIDE RESIN COMPOSITION

[75] Inventors: Sho Kadoi, Ichihara; Hidemi Yabe; Kazuhiko Kobayashi, both of Nagoya, all of Japan

[73] Assignee: Toray Industries, Inc., Japan

[21] Appl. No.: 166,735

[22] Filed: Dec. 14, 1993

Related U.S. Application Data

[63] Continuation of Ser. No. 924,424, Jul. 31, 1992, abandoned, which is a continuation of Ser. No. 512,865, Apr. 23, 1990, abandoned.

[30] Foreign Application Priority Data

Apr. 25, 1989 [JP] Japan ..................................... 1-106197

[51] Int. Cl.$^6$ ..................... C08F 283/06; C08F 283/04; C08L 81/04
[52] U.S. Cl. .................. 524/423; 524/424; 524/425; 524/428; 524/431; 524/433; 524/436; 524/444; 524/445; 524/447; 524/449; 524/451; 524/452; 524/456; 524/494; 524/609; 525/420; 525/426; 525/537
[58] Field of Search ..................................... 525/420, 537, 525/66, 426; 524/423, 424, 425, 428, 431, 433, 436, 444, 445, 447, 449, 451, 452, 456, 494, 609

[56] References Cited

U.S. PATENT DOCUMENTS

| 4,292,416 | 9/1981 | Shue et al. | 525/420 |
|---|---|---|---|
| 4,528,335 | 7/1985 | Selby et al. | 525/420 |
| 4,528,346 | 7/1985 | Sugie et al. | 525/523 |
| 4,699,975 | 10/1987 | Katto et al. | 528/486 |
| 4,839,425 | 6/1989 | Mawataki et al. | 525/66 |
| 5,026,764 | 6/1991 | Okabe et al. | 525/537 |
| 5,214,083 | 5/1993 | Kodaira et al. | 525/390 |
| 5,254,609 | 10/1993 | Serizawa et al. | 525/537 |
| 5,286,809 | 2/1994 | Heinz et al. | 525/420 |

FOREIGN PATENT DOCUMENTS

| 0193951 | 9/1986 | European Pat. Off. |
|---|---|---|
| 0241019 | 10/1987 | European Pat. Off. |
| 52-42314 | 12/1978 | Japan |
| 56-54290 | 10/1982 | Japan |

*Primary Examiner*—George F. Lesmes
*Assistant Examiner*—Helen F. Lee
*Attorney, Agent, or Firm*—Austin R. Miller

[57] ABSTRACT

Disclosed is a polyphenylene sulfide resin composition having a superior heat resistance and impact resistance obtained by melt-kneading a modified polyphenylene sulfide resin obtained by reacting a polyphenylene sulfide resin with a carboxylic acid anhydride, with at least one thermoplastic resin selected from a polyamide resin, a polyester resin, a polycarbonate resin, a polysulfone resin, and a polyamide-imide resin.

7 Claims, No Drawings

POLYPHENYLENE SULFIDE RESIN COMPOSITION

This application is a continuation of application Ser. No. 07/924,424, filed Jul. 31, 1992, which is a continuation of application Ser. No. 07/512,865 filed Apr. 23, 1990 both now abandoned.

BACKGROUND OF THE INVENTION

1. Field of the Invention

The present invention relates to a polyphenylene sulfide resin composition having good thermal properties and mechanical properties such as impact resistance.

2. Description of the Prior Art

A polyphenylene sulfide (hereinafter referred to as "PPS") resin is superior in the properties required for engineering plastics, such as a high heat resistance, high flame retardancy and high rigidity, and thus is used in various fields for, in particular, injection molding.

Furthermore, it is known that a PPS resin has good compatibility with inorganic additives, and thus the mechanical properties thereof can be improved by mixing a variety of additives or fibrous reinforcing agents with the PPS resin.

Many methods of incorporating various thermoplastic resins into the PPS resin, to improve the characteristics thereof, have been investigated. For example, polyamide resin-incorporated PPS resin compositions are disclosed in Japanese Examined Patent Publication No. 59-1422 and Japanese Unexamined Patent Publication No. 53-69255; polyester resin-incorporated PPS resin compositions are disclosed in Japanese Unexamined Patent Publication No. 57-131243 and Japanese Unexamined Patent Publication No. 57-168945; polycarbonate resin-incorporated PPS resin compositions are disclosed in Japanese Examined Patent Publication No. 53-13468 and Japanese Unexamined Patent Publication No. 51-10015; and aromatic polysulfone resin-incorporated PPS resin compositions are disclosed in U.S. Pat. No. 4,021,569.

Also, Japanese Unexamined Patent Publication No. 53-127551 discloses compositions formed by incorporating an aromatic polysulfone resin and a polyamide resin in a PPS resin, Japanese Unexamined Patent Publication No. 59-164360 discloses compositions formed by incorporating an aromatic polysulfone resin and an epoxy resin in a PPS resin, and Japanese Unexamined Patent Publication No. 62-295957 discloses compositions formed by incorporating an aromatic polysulfone resin and a polyamide-imide resin in a PPS resin.

In the conventional resin compositions disclosed in the foregoing patent publications, since the compatibility of the PPS resin with other thermoplastic resins to be incorporated into the PPS resin is not satisfactory, the mechanical strength and the like are extremely poor and the desired object of the blending is not realized.

SUMMARY OF THE INVENTION

Therefore a primary object of the present invention is to provide a polyphenylene sulfide resin composition having superior heat resistance and impact resistance.

Another object of the present invention is to provide a polyphenylene sulfide resin composition having the above-mentioned superior properties by adopting a polymer blending (alloying) means of combining a PPS resin with other thermoplastic resin.

Still another object of the present invention is to provide and utilize a compatibilizing technique by which a polyphenylene sulfide resin is blended (i.e., alloyed) with another thermoplastic resin.

In accordance with the present invention, there is provided a polyphenylene sulfide resin composition comprising 99 to 1 parts by weight of a modified polyphenylene sulfide resin obtained by reacting a polyphenylene sulfide resin with 0.03 to 30% by weight, based on the polyphenylene sulfide resin, of a carboxylic acid anhydride selected from the group consisting of maleic, itaconic and succinic anhydride and 1 to 99 parts by weight of at least one thermoplastic resin selected from the group consisting of a polyamide resin, a polyester resin, a polycarbonate resin, a polysulfone resin and a polyamide-imide resin; both resins being melt-kneaded together.

DESCRIPTION OF THE PREFERRED EMBODIMENTS

The PPS resin used in the present invention is a polymer comprising at least 70 mole %, preferably at least 90 mole %, of repeating units represented by the structural formula

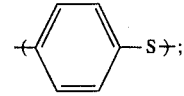

a polymer comprising the above repeating units in an amount smaller than 70 mole % is not preferred because the heat resistance is lowered.

In general, the PPS resin includes a polymer having a relatively low molecular weight, which is typically prepared according to the process disclosed in Japanese Examined Patent Publication No. 45-3368, and a substantially linear polymer having a relatively high molecular weight, which is typically prepared according to the process disclosed in Japanese Examined Patent Publication No. 52-12240. In the polymer obtained according to the process disclosed in Japanese Examined Patent Publication No. 45-3368, the degree of polymerization can be increased by heating in an oxygen atmosphere the polymer obtained by polymerization or heating the polymer in the presence of a crosslinking agent such as a peroxide.

In the present invention, it is not particularly critical which process is used for the preparation of the PPS resin, but preferably a substantially linear polymer having a relatively high molecular weight is used.

The PPS resin used in the present invention can comprise up to 30 mole % of repeating units represented by one or more of the following formulae:

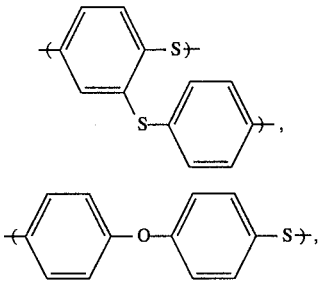

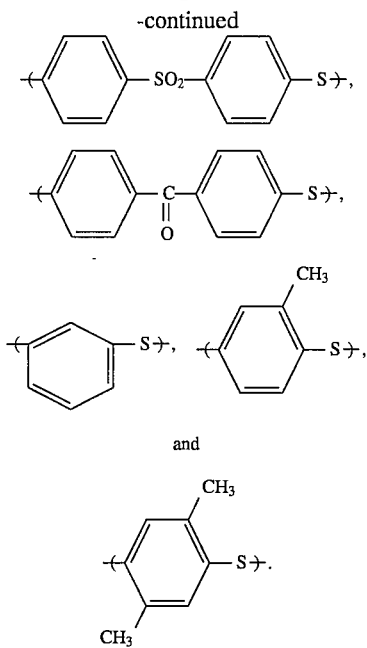

As the carboxylic acid anhydride used for modifying the PPS resin in the present invention, there can be mentioned maleic; itaconic and succinic anhydrides. These carboxylic anhydrides can be used alone or in the form of a mixture of two or more thereof.

The ratio of the carboxylic acid anhydride to be reacted with the PPS resin is 0.01 to 30% by weight, preferably 0.02 to 10% by weight, most preferably 0.03 to 5.0% by weight, based on the PPS resin. If the ratio of the carboxylic acid anhydride reacted is lower than 0.01% by weight, the intended effect cannot be attained, and if the ratio of the carboxylic acid anhydride reacted is higher than 30% by weight, the heat resistance, strength, rigidity and color become poor.

It is not particularly critical which means is used for reacting the PPS resin with the carboxylic acid anhydride, for example, a method can be adopted in which the PPS resin and carboxylic acid anhydride are melt-kneaded together at a temperature higher than the melting point of the PPS resin in an extruder and the kneaded mixture is pelletized, a method in which the PPS resin and carboxylic acid anhydride are melt-kneaded in a heating mixer, and a method in which the PPS resin and carboxylic acid anhydride are reacted in a solvent. Preferably, the method in which the PPS resin and carboxylic acid anhydride are melt-kneaded in an extruder and the kneaded mixture is pelletized is adopted.

The melt viscosity of the modified PPS resin used in the present invention is not particularly critical, so long as a kneading with a thermoplastic resin to be blended is possible, and in general a modified PPS resin having a melt viscosity of 100 to 10,000 poise as measured at a temperature of 320° C. and a shear rate of 10 sec$^{-1}$ is used.

As the polyamide to be incorporated in the modified PPS resin in the present invention, there can be mentioned polyamides obtained by a ring-opening polymerization of lactams such as ε-caprolactam and ω-dodecalactum; polyamides derived from amino acids such as 6-aminocaproic acid, 11-aminoundecanoic acid and 12-aminododecanoic acid; polyamides divided from aliphatic, alicyclic and aromatic diamines such as ethylenediamine, tetramethylenediamine, hexamethylenediamine, undecamethylenediamine, dodecamethylenediamine, 2,2,4-/2,4,4-trimethylhexamethylenediamine, 1,3- and 1,4-bis(aminomethyl)cyclohexanes, bis(4,4'-aminocyclohexyl)methane and meta- and para-xylylenediamines, and aliphatic, alicyclic and aromatic dicarboxylic acids and derivatives thereof, for example, acid chlorides, such as adipic acid, suberic acid, sebacic acid, dodecanoic acid, 1,3- and 1,4-cyclohexanedicarboxylic acids, isophthalic acid, terephthalic acid, dimer acid and derivatives thereof such as acid chlorides; and copolyamides and mixed polyamides thereof. Of these polyamides, in general, polycaproamide (nylon 6), polyundecanamide (nylon 11), polydodecanamide (nylon 12), polyhexamethylene adipamide (nylon 66) and copolyamides composed mainly of these polyamides are valuably used. For the polymerization for obtaining these polyamides, generally known melt polymerization, solid polymerization and solution polymerization methods can be adopted alone or in combination.

The degree of polymerization of the polyamide is not particularly critical, and a polyamide having a relative viscosity within a range of 2.0 to 5.0 as measured at 25° C. with respect to a solution of 1 g of the polymer in 100 ml of 98% concentrated sulfuric acid is optionally used according to the intended object.

As the polyester resin used in the present invention, there can be mentioned polycondensates of a dicarboxylic acid and/or a derivative thereof with a diol and/or a diphenol, and self-polycondensates of a hydroxycarboxylic acid and/or a derivative thereof. As examples of the dicarboxylic acid and the derivative thereof, there can be mentioned terephthalic acid, isophthalic acid, phthalic acid, naphthalene-dicarboxylic acid, diphenylethane-4,4'-dicarboxylic acid and biphenyl-4,4'-dicarboxylic acid; substitution products of these aromatic dicarboxylic acids with an alkyl group having 1 to 10 carbon atoms, a phenyl group, a halogen atom, a nitro group, an alkoxy group having 1 to 10 carbon atoms or a phenoxy group, aliphatic dicarboxylic acids such as azelaic acid, sebacic acid, adipic acid, and dodecanoic acid, alicyclic dicarboxylic acids such as cyclohexane-dicarboxylic acid and substitution products thereof with an alkyl group having 1 to 10 carbon atoms, or a phenyl group, acid halide derivatives such as acid chlorides of these dicarboxylic acids, acid anhydride derivatives such as acetylation products, and ester derivatives such as methyl esters and ethyl esters.

As examples of the diol and the derivative thereof, there can be mentioned aliphatic glycols such as ethylene glycol, butanediol, propylene glycol, neopentyl glycol, 1,5-pentanediol, 1,6-hexanediol, decamethylene glycol, polyethylene glycol, poly-1,3-propylene glycol, and polytetramethylene glycol; aromatic glycols such as p-hydroquinone, resorcinol, catechol and biphenyl-1,4-diol; substitution products thereof with an alkyl group having 1 to 10 carbon atoms, a phenyl group, an alkoxy group having 1 to 10 carbon atoms, a phenoxy group or a nitro group; alicyclic glycols such as cyclohexanediol, cyclohexanedimethanol and cyclohexanediethanol; substitution products thereof with an alkyl group having 1 to 10 carbon atoms, a phenyl group, an alkoxy group having 1 to 10 carbon atoms, or a phenoxy groups; and ester derivatives of these glycols such as acetic acid esters.

As examples of the hydroxycarboxylic acid and derivatives thereof, there can be mentioned p-hydroxybenzoic acid, m-hydroxybenzoic acid, and ester derivatives, acid anhydride derivatives, and acid halide derivatives thereof.

Either a homopolymer or a copolyester can be used as the polyester resin, and polyethylene terephthalate, polybutylene terephthalate, polyethylene α,β-bisphenoxyethane-4-4'-dicarboxylate and a liquid crystal polyester are preferably used.

The degree of polymerization of the polyester resin is not particularly critical, but preferably a polyester resin having an intrinsic viscosity of from 0.5 to 1.5, as determined at 25° C. with respect to a 0.5% solution in o-chlorophenol, is used.

An aromatic polycarbonate, an aliphatic polycarbonate and an aliphatic-aromatic polycarbonate can be used as the polycarbonate resin in the present invention, but in general, homopolymers and copolymers composed of bisphenols such as 2,2-bis(4-hydroxyphenyl)alkanes, bis(4-hydroxyphenyl)ethers, bis(4-hydroxyphenyl)sulfones, sulfides or sulfoxides are preferred. Polymers of bisphenols substituted with a halogen atom can be used according to the intended object.

The polycarbonate resin can be prepared by an optional process. For example, a polycarbonate of 4,4'-dihydroxydiphenyl-2,2-propane (commonly called "bisphenol A") is prepared by a known process such as a phosgene process, in which 4,4'-dihydroxydiphenyl-2,2-propane is used as the dihydroxy compound and phosgene is blown in the presence of an aqueous solution of an alkali metal hydroxide and a solvent, or a process in which an ester exchange reaction is carried out between 4,4'-dihydroxydiphenyl-2,2-propane and a diester of carbonic acid in the presence of a catalyst.

The polysulfone resin used in the present invention is an aromatic polymer of the type obtained by condensing an alkali metal phenolate group with an aromatic halogen group activated by an electron-attracting sulfone group in a non-protonic polar solvent, which is a linear polymer comprising, as indispensable bonding units, arylene bonds (aromatic bonds), ether bonds and sulfone bonds. More specifically, there can be mentioned polymers obtained by (a) a process in which an alkali metal phenolate of a bisphenol is condensed with an aromatic dihalide having a sulfone bond in the molecule or (b) a process in which an alkali metal phenolate of an aromatic halophenol having a sulfone bond in the molecule is polycondensed.

As examples of the bisphenol used in the process (a), there can be mentioned hydroquinone, resorcinol, bis-(hydroxyphenyl)alkanes such as 2,2-bis(4-hydroxyphenyl)propane, 2,4-dihydroxydiphenylmethane, bis-(4-hydroxyphenyl)methane, bis-(2-hydroxyphenyl)methane, bis-(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 2,2-bis(4-hydroxynaphthyl)propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, and p-α,α'-bis(4-hydroxyphenyl)-p-diisopropylbenzene; di(hydroxyphenyl) ethers such as bis-(4-hydroxyphenyl) ether, 4,3'-, 4,2'-, 2,2'- and 2,3'-hydroxydiphenyl ethers, 4,4'-dihydroxy-2,6-dimethyldiphenyl ether, and bis-(4-hydroxynaphthyl) ether; di(hydroxyphenyl)sulfones such as bis-(4-hydroxyphenyl)sulfone, bis-(3-hydroxyphenyl)sulfone, 2,4'-dihydroxyphenylsulfone, and 2,4'-dihydroxydiphenylsulfone; and analogues thereof having at least 3 phenyl nuclei. Substitution products formed by introducing an inactive substituent such as an alkyl group having 1 to 9 carbon atoms, an aryl or aralkyl group having 6 to 18 carbon atoms, or an ether group having 1 to 12 carbon atoms into benzene nuclei of the foregoing bisphenols can be used. These bisphenols can be used alone or in the form of a mixture of two or more thereof.

As the aromatic dihalide used in the process (a), there can be mentioned 4,4'-dichlorodiphenylsulfone, 4,4'-difluorodiphenylsulfone, 4,4'-dibromodiphenylsulfone, 4,4'-diiododiphenylsulfone, 2,4'-dichlorodiphenylsulfone, 2,4'-dibromodiphenylsulfone, 2,4'-difluorodiphenylsulfone, 2,4'-diiododiphenylsulfone, and compounds represented by the following formulae in which X represent a halogen atom, that is, a fluorine, chlorine, bromine or iodine atom:

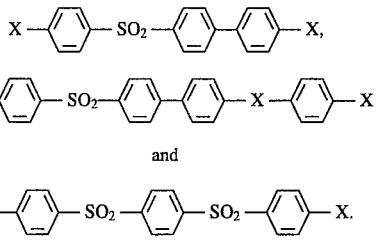

and

Furthermore, substitution products obtained by introducing an inactive group such as an alkyl group having 1 to 9 carbon atoms, an aryl or aralkyl group having 6 to 18 carbon atoms, or an ether group having 1 to 12 carbon atoms, or an electron-attracting activating group such as a halogen atom, a nitro group, an alkylsulfone group, an arylsulfone group or a nitroso group, into the benzene nuclei of the foregoing aromatic dihalides, can be used. These aromatic dihalides can be used alone or in the form of a mixture of two or more thereof.

As examples of the aromatic halophenol having a sulfone bond in the molecule, used in the process (b), there can be mentioned compounds represented by the following formulae in which X represents a halogen atom, that is, a fluorine, chlorine, bromine or iodine atom:

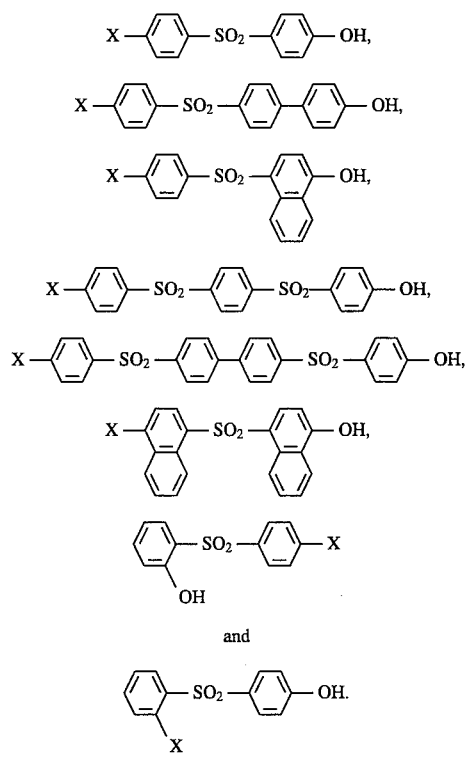

and

Substitution products obtained by introducing a substituent such as an alkyl group having 1 to 9 carbon atoms, an aryl or aralkyl group having 6 to 18 carbon atoms, or an ether group having 1 to 12 carbon atoms into the benzene nuclei of the foregoing compounds, or by introducing an electron-attracting activating group such as a nitro group, an alkylsulfone group, an arylsulfone group, a nitroso group, or a halogen atom into the halogen-bonded benzene nuclei of the foregoing compounds can be effectively used. These halophenols synthesized in advance can be used, but alternatively, an alkali metal phenolate of a halophenol prepared by first reacting a dihalide with an alkali metal hydroxide in the polymerization reaction system can be used. These halophenols can be used alone or in the form of a mixture of two or more thereof, or in the form of the above-mentioned bisphenol/dihalide mixture.

From the viewpoint of economy handling ease, sodium phenolates and potassium phenolates are preferably used as the alkali metal phenolate of the bisphenol or aromatic halophenol, but other alkali metal phenolates can be used. The presynthesized alkali metal phenolate can be used, but alternatively, the alkali metal phenolate can be prepared by first reacting an aromatic hydroxyl group with an alkali metal hydroxide in the polymerization reaction system.

The polymerization for the formation of a polysulfone resin comprising the above-mentioned components is generally carried out in a solvent under anhydrous conditions at a temperature of at least 100° C. Where a phase transfer catalyst such as a crown ether is especially used, an aromatic polysulfone polymer sometimes can be obtained by the interface polycondensation method carried out at a low temperature.

As typical examples of the polysulfone resin prepared in the above-mentioned manner, there can be mentioned polymers represented by the following structural formulae:

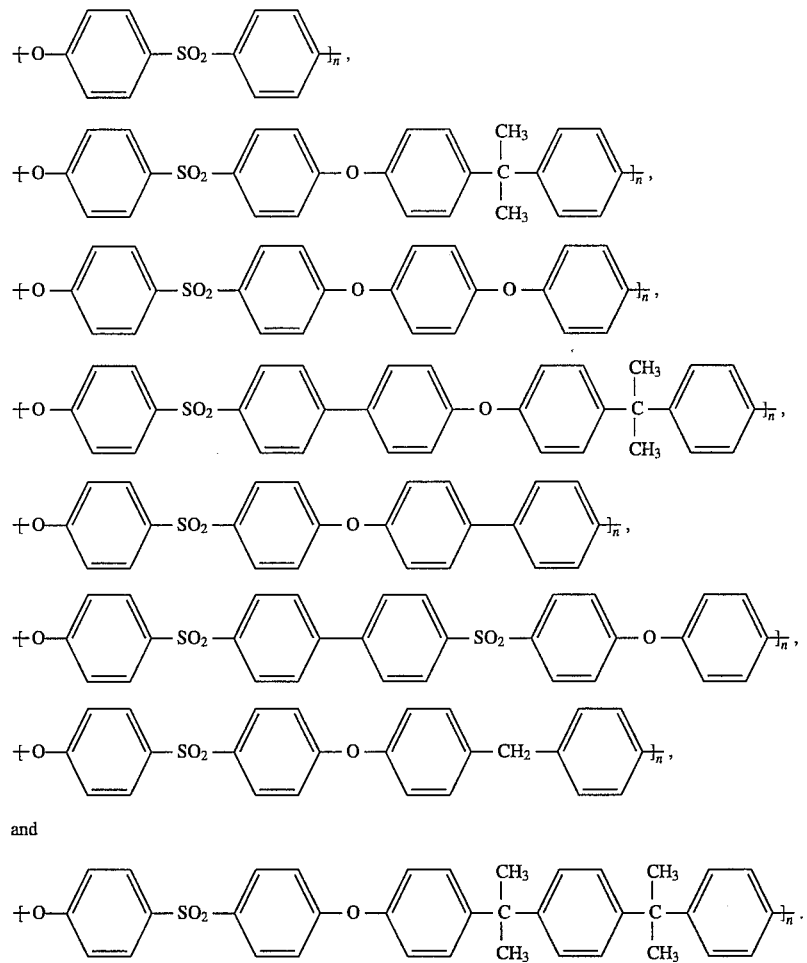

and

The polymerization for forming these polysulfone resins can be carried out under the conditions disclosed in detail in Japanese Examined Patent Publication No. 42-7799 and Japanese Examined Patent Publication No. 47-617.

The particular terminals of the polysulfone resin are not particularly critical, but an aromatic polysulfone resin having a hydroxyl group or an alkali metal phenolate group at the terminals is preferably used. The aromatic polysulfone resin having a hydroxyl group or an alkali metal phenolate group at the terminals can be easily obtained by carrying out an acid treatment after the polymerization or without performing a terminal-blocking treatment.

The polyamide-imide resin used in the present invention is a polymer having, as main structural units, recurring units represented by the following general formula (I):

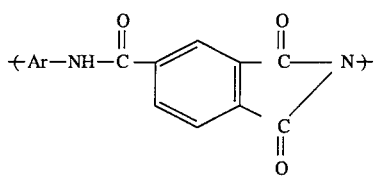
(I)

wherein Ar represents a divalent aromatic residue having 1 to 6 six-carbon membered rings.

As specific examples of the divalent aromatic residue, the following groups can be mentioned:

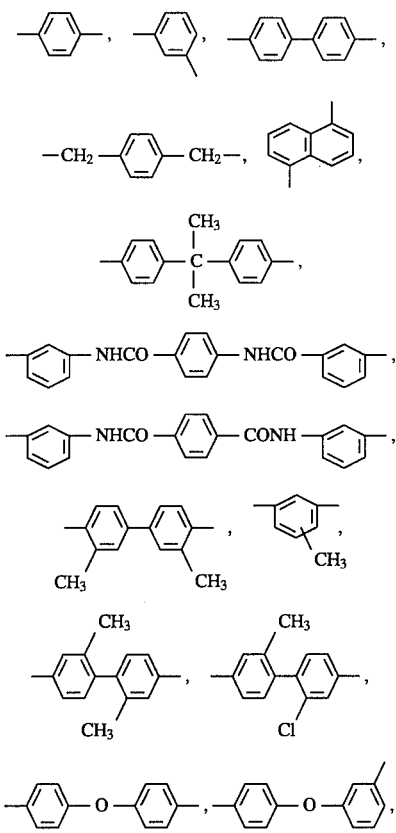

-continued

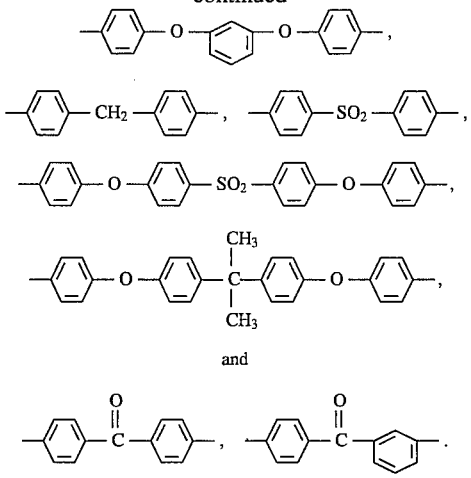

and

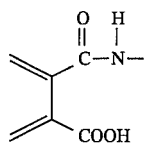

The polymer represented by the above-mentioned formula (I) can be a homopolymer or a copolymer, and a polymer in which parts of imide bonds in the structure of formula (I) are still in the state of the following amido acid bonds as the closed ring precursor is included:

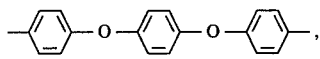

The logarithmic viscosity number of the polyamide-imide resin used in the present invention is not particularly limited, but in view of the mechanical properties the logarithmic viscosity number is preferably at least 0.2, and in view of the moldability at the molding step, the logarithmic viscosity number is more preferably 0.2 to 2.0.

An especially typical instance of the polyamide-imide resin has the following molecular structure:

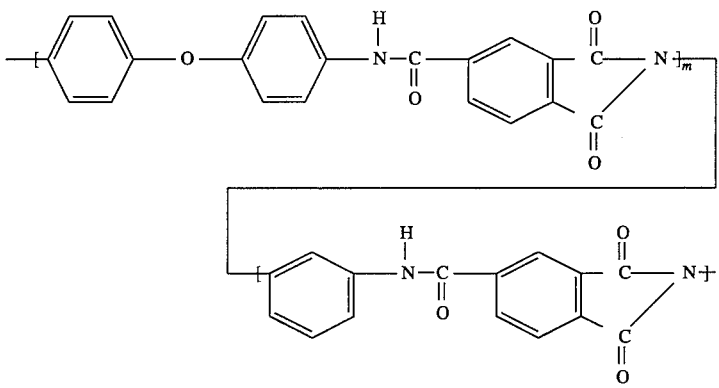

An aromatic polyamide-imide resin of this type prepared according to the process disclosed in British Patent No. 1,056,564 or U.S. Pat. No. 3,661,832 can be used. Furthermore, an aromatic polyamide-imide resin marketed under the tradename of "Torlon" by Amco Co., U.S.A. can be used.

Moreover, other aromatic polyamide-imide resins prepared by the processes disclosed in detail in U.S. Pat. No. 3,669,937, French Patent No. 2,096,454, French Patent No. 15,066, Japanese Examined Patent Publication No. 45-18316, British Patent No. 1,181,446, Japanese Examined Patent Publication No. 45-35072, U.S. Pat. No. 3,625,911, British Patent No. 1,277,834, British Patent No. 1,032,649, Japanese Examined Patent Publication No. 49-4077 and Japanese Unexamined Patent Publication No. 61-195127 can be used.

In the present invention, at least one thermoplastic resin selected from a polyamide resin, a polyester resin, a polycarbonate resin, a polysulfone resin and a polyamide-imide resin is incorporated in an amount of 1 to 99 parts by weight into 99 to 1 parts by weight of the PPS resin. In the region where the mixing ratio of the PPS resin is relatively high, an impact resistance and other characteristics can be imparted without a lowering of the heat resistance and moldability inherently possessed by the PPS resin. Conversely, in the region where the mixing ratio of the other thermoplastic resin is relatively high, heat resistance, chemical resistance and moldability can be imparted without a lowering of the characteristics inherently possessed by the respective resins. As seen from the foregoing description, resin compositions having well-balanced properties can be obtained in each of the mixing ratio regions.

It is not particularly critical which method of preparing the resin composition of the present invention comprising a modified PPS resin obtained by reacting PPS with a carboxylic acid anhydride and at least one thermoplastic resin selected from a polyamide resin, a polyester resin, a polycarbonate resin, a polysulfone resin and a polyamide-imide resin is used. For example, one of a method in which the carboxylic acid anhydride-modified PPS resin and the other thermoplastic resin are melt-kneaded together at a temperature higher than the melting points of these resins in an extruder, and a method in which the resins are melt-blended together in a heating mixer is employed, and the former method in which the resins are melt kneaded in an extruder is preferably adopted.

An antioxidant, a heat stabilizer, a lubricant, a crystal nucleating agent, an ultraviolet inhibitor, a colorant, a flame retardant and other usual additives, and small amounts of other polymers, can be incorporated into the resin composition of the present invention, so long as obtaining the intended effects of the present invention is not hindered. Furthermore, to control the degree of crosslinking of the PPS, a usual peroxide, a crosslinking promoter such as a metal salt of thiophosphinic acid disclosed in Japanese Unexamined Patent Publication No. 59-131650, or a crosslinking inhibitor such as a dialkyl tin dicarboxylate or aminotriazole disclosed in Japanese Unexamined Patent Publication No. 58-204045 or Japanese Unexamined Patent Publication No. 58-204046, can be incorporated.

In the present invention, a fibrous and/or granular reinforcing agent is not an indispensable component but can be incorporated in an amount of up to 400 parts by weight per 100 parts by weight of the resin composition of the present invention, according to need. In general, if the reinforcing agent is incorporated in an amount of 10 to 300 parts by weight, the strength, rigidity, heat resistance, and dimensional stability are improved.

As the fibrous reinforcing agent, there can be mentioned inorganic fibers such as a glass fiber, an alumina fiber, a silicon carbide fiber, a ceramic fiber, an asbestos fiber, a gypsum fiber, a metal fiber, and a carbon fiber.

As the granular reinforcing agent, there can be mentioned silicates such as wollastonite, sericite, kaolin, mica, clay, bentonite, asbestos, talc, and alumina silicate; metal compounds such as alumina, magnesium oxide, zirconium oxide, and titanium oxide; carbonates such as calcium carbonate, magnesium carbonate, and dolomite; sulfates such as calcium sulfate and barium sulfate; and glass bead, boron nitride, silicon carbide, and silica. These granular reinforcing agents can have a hollow structure, at least two of the foregoing reinforcing agents can be used in combination, and the reinforcers can be used after the preliminary treatment with a silane or titanium coupling agent.

The present invention will now be described in detail with reference to the following examples that by no means limit the scope of the invention.

In the following examples, the tensile strength, flexural strength, Izod impact strength, heat distortion temperature, and water absorption were measured by the following methods.

Tensile strength: ASTM D-638
Flexural strength: ASTM D-790
Flexural modulus: ASTM D-790
Izod impact strength: ASTM D-256
Heat distortion temperature: ASTM D-648
Water absorption: ASTM D-570

REFERENTIAL EXAMPLE 1

(Polymerization for Formation of PPS)

An autoclave was charged with 3.26 kg (25 moles; containing 40% of water of crystallization) of sodium disulfide, 4 g of sodium hydroxide, 1.36 kg (about 10 moles) of sodium acetate trihydrate, and 7.9 kg of N-methyl-2-pyrrolidone (hereinafter referred to as "NMP"), the temperature was gradually elevated to 205° C. with stirring, and about 1.5 l of the distillate containing 1.36 kg of water was removed. Then 3.75 kg (25.5 moles) of 1,4-dichlorobenzene and 2 kg of NMP were added to the residual mixture and the mixture was heated at 265° C. for 4 hours. The reaction product was washed five times with warm water at 70° C. and dried under a reduced pressure at 80° C. for 24 hours, to obtain about 2 kg of powdery PPS (A-1) having a melt viscosity of about 2,500 poise as measured at a temperature of 320° C. and a shear rate of 10 sec$^{-1}$.

The foregoing procedures were repeated and the products were used in the examples given hereinafter.

REFERENTIAL EXAMPLE 2

The PPS powder obtained in Referential Example 1 was stirred at 80° C. for 30 minutes with an aqueous solution of acetic acid in which the pH value had been adjusted to 4, and the powder was washed three times with deionized water at 70° C. and vacuum-dried at 80° C. for 24 hours to obtain a PPS powder (A-2). This powder was used in the examples given hereinafter.

REFERENTIAL EXAMPLE 3

An autoclave was charged with the PPS powder obtained in Referential Example 1 and deionized water, the temperature was elevated to 150° C. with stirring, the mixture was maintained at this temperature for 30 minutes and then cooled, and the powder was washed once with deionized water at 70° C. and vacuum-dried at 80° C. for 24 hours to obtain a PPS powder (A-3). The obtained powder was used in the examples given hereinafter.

EXAMPLES 2 THROUGH 4

The PPS powders obtained in Referential Examples 2 and 3 were dry-blended with each of the claimed carboxylic acid anhydrides at the ratios shown in Table 1, and the blends were melt-kneaded, extruded, and pelletized by an extruder set at 290 to 310° C. to obtain modified PPS's (B-2 through B-4). The reaction of the PPS with the carboxylic acid anhydride was confirmed by extracting the pellet, formed by kneading, for 8 hours with methanol, melt-pressing the residue at 320° C. to form a film, and analyzing the characteristic absorption of vC=O at 1,700 to 1,800 $cm^{-1}$ in the IR spectrum of the obtained film. The physical properties of the obtained modified PPS's were as shown in Table 2.

EXAMPLES 5 THROUGH 7

The modified PPS pellets modified with maleic anhydride obtained in Examples 2 and 4 were dry-blended with nylon 66 (polyhexamethylene adipamide) at the ratios shown in Table 1, and the blends were melt-kneaded and pelletized by an extruder set at 290 to 310° C. Test pieces for the evaluation test were prepared by molding the obtained pellets at a mold temperature of 150° C. by an injection molding machine. The physical properties of the obtained test pieces were measured and the results are shown in Table 3.

COMPARATIVE EXAMPLES 1 THROUGH 3

Melt kneading, pelletizing and injection molding were carried out in the same manner as described in Examples 6 through 7 except that PPS resins obtained by pelletizing the PPS powders obtained in Referential Examples 2 and 3 were used instead of the modified PPS pellets, and the physical properties of the obtained test pieces were measured. The results are shown in Table 3.

As is apparent from the results shown in Table 3, the physical properties obtained in Comparative Examples 1 through 3 were far inferior to those obtained in Examples 5 through 7, where the PPS reacted with maleic anhydride was used according to the present invention.

EXAMPLE 8

The modified PPS obtained in Example 1 was dry-blended with nylon 6 (polycaprolactam) having a relative viscosity of 2.4 in sulfuric acid and a glass fiber at the ratio shown in Table 1, and melt kneading, pelletizing and injection molding were carried out in the same manner as described in Example 7 to obtain a test piece for the evaluation test. The physical properties of the obtained test piece were measured and the results are shown in Table 3.

EXAMPLES 9 THROUGH 11

The modified PPS obtained in Example 4 was dry-blended with polyethylene terephthalate (Mitsui PET J155 supplied by Mitsui Petrochemical Industries) and a glass fiber at the ratio shown in Table 1, and a test piece for the evaluation test was prepared by carrying out melt kneading, pelletizing and injection molding in the same manner as described in Example 7. The physical properties of the obtained test piece were measured and the results are shown in Table 4.

COMPARATIVE EXAMPLES 4 THROUGH 6

The PPS (A-3) obtained in Referential Example 1 was dry-blended with the components shown in Table 1 at the ratio shown in Table 1 in the same manner as described in Examples 9 through 11, and test pieces for the evaluation test were prepared by carrying out melt kneading, pelletizing and injection molding in the same manner as described in Examples 7 through 9. The physical properties of the test pieces were measured and the results are shown in Table 4. As is apparent from the results shown in Table 4, the physical properties obtained in Comparative Examples 4 through 6 were far inferior to those obtained in Examples 9 through 11.

EXAMPLES 12 AND 13

The PPS powder obtained in Referential Example 2 was dry-blended with maleic anhydride and a polycarbonate (Panlite supplied by Teijin Kasei) at the ratio shown in Table 1, and test pieces were prepared by carrying out melt kneading, pelletizing and injection molding in the same manner as described in Example 2. The physical properties of the obtained test pieces were measured and the results are shown in Table 5.

COMPARATIVE EXAMPLES 7 AND 8

The PPS prepared in Referential Example 2 was dry-blended with the components shown in Table 1 at the ratio shown in Table 1 in the same manner as described in Examples 12 and 13, and test pieces were prepared by carrying out melt kneading, pelletizing and injection molding in the same manner as described in Examples 12 and 13. The physical properties of the obtained test pieces were measured and the results are shown in Table 5. From the results shown in Table 5, it is obvious that the physical properties obtained in Comparative Examples 7 and 8 were far inferior to those obtained in Examples 12 and 13.

EXAMPLES 14 AND 15

A four-neck flask equipped with a thermometer, a stirrer, a nitrogen-introducing tube, and a distilling tube was charged with 228.3 g (1.0 mole) of bisphenol A, 160.0 g (2.0 moles) of a 50% aqueous solution of sodium hydroxide, 500 g of dimethylsulfoxide, and 1,500 g of chlorobenzene. In a nitrogen atmosphere, the temperature was gradually elevated to 160° C. with stirring, and water in the reaction mixture was removed by azeotropic distillation with chlorobenzene. After the temperature had been elevated to 160° C., the temperature was dropped to 130° C., and a 50% solution of 287.2 g (1.0 mole) of 4,4'-dichlorodiphenylsulfone in chlorobenzene was added to the mixture, the temperature was again elevated to 160° C. while removing chlorobenzene by distillation, and a reaction was carried out at this temperature for 1 hour. After the reaction, the temperature was dropped to 100° C. and 10 ml of acetic acid was added to the reaction mixture to change the terminal —ONa of the polymer to —OH. Then, the reaction mixture was diluted with 1,500 g of chlorobenzene, NaCl formed as the by-product was removed by suction filtration, and the residue was precipitated in a large quantity of ethanol. The precipitate was recovered by filtration and vacuum-dried at 130° C. for 12 hours to obtain a polysulfone having terminal OH groups.

The obtained polysulfone having terminal OH groups and the modified PPS obtained in Example 4 were dry-blended at the ratio shown in Table 1, and test pieces for the evaluation test were prepared by carrying out melt kneading, pelletizing and injection molding in the same manner as described in Example 5. The physical properties of the obtained test pieces were measured and the results are shown in Table 5.

COMPARATIVE EXAMPLES 9 AND 10

The polysulfone having terminal OH groups, obtained in Examples 14 and 15, was dry-blended with the PPS (A-3) prepared in Referential Example 3 at the ratio shown in Table 1, and test pieces for the evaluation test were prepared by carrying out melt kneading, pelletizing and injection molding in the same manner as described in Examples 14 and 15. The physical properties of the obtained test pieces were measured and the results are shown in Table 5. From the results shown in Table 5, it is seen that the physical properties obtained in Comparative Examples 9 and 10 were far inferior to those obtained in Examples 12 and 13 of the present invention.

EXAMPLES 16 AND 17

The modified PPS obtained in Example 3, a polyethersulfone (VICTREX-5003P supplied by ICI), and a glass fiber were dry-blended at the ratio shown in Table 1, and test pieces for the evaluation test were prepared by carrying out melt kneading, pelletizing and injection molding in the same manner as described in Example 5. The physical properties of the obtained test pieces were measured and the results are shown in Table 6.

EXAMPLES 18 AND 19

The modified PPS obtained in Example 2 and a polyamideimide resin (Torlon 4208 supplied by Amco Co.) were dry-blended at the ratio shown in Table 1, and the blend was melt-kneaded and pelletized by an extruder set at 320 to 350° C. The pellet was supplied to a screw-in-line type injection molding machine maintained at 320 to 350° C. and the blend was molded into a test piece at a mold temperature of 150° C. The physical properties of the obtained test piece were measured and the results are shown in Table 6.

TABLE 1

| Example No. | PPS | Additive | PPS/additive ratio (%) | Modified PPS |
|---|---|---|---|---|
| 1 | A-1 | Phthalic anhydride | 98/2 | B-1 |
| 2 | A-2 | Maleic anhydride | 99/1 | B-2 |
| 3 | A-2 | Itaconic anhydride | 99.5/0.5 | B-3 |
| 4 | A-3 | Succinic anhydride | 99/1 | B-4 |

TABLE 1-continued

| Example No. | PPS | Additive | PPS/additive ratio (%) | Modified PPS |
|---|---|---|---|---|
| 5 | B-2 | N-66 | 70/30 | — |
| 6 | B-2 | N-66 | 50/50 | — |
| 7 | B-4 | N-66 | 30/70 | — |
| 8 | B-1 | (N-6/GF) | 42/(18/40) | — |
| 9 | B-4 | (PET*1/GF) | 42/(18/40) | — |
| 10 | B-4 | (PET*1/GF) | 30/(30/40) | — |
| 11 | B-4 | (PET*1/GF) | 18/(42/40) | — |
| 12 | B-2 | PC*2 | 70/30 | — |
| 13 | B-2 | PC*2 | 30/70 | — |
| 14 | B-4 | PSO*3 | 80/20 | — |
| 15 | B-4 | PSO*3 | 20/80 | — |
| 16 | B-3 | PES*4 | 70/30 | — |
| 17 | B-3 | PES*4 | 30/70 | — |
| 18 | B-2 | PAI*5 | 70/30 | — |
| 19 | B-2 | PAI*5 | 30/70 | — |
| 1 | A-2 | N-66 | 70/30 | — |
| 2 | A-2 | N-66 | 50/50 | — |
| 3 | A-3 | N-66 | 30/70 | — |
| 4 | A-3 | (PET*1/GF) | 42/(18/40) | — |
| 5 | A-3 | (PET*1/GF) | 30/(30/40) | — |
| 6 | A-3 | (PET*1/GF) | 18/(42/40) | — |
| 7 | A-2 | PC*2 | 70/30 | — |
| 8 | A-2 | PC*2 | 30/70 | — |
| 9 | A-3 | PSO*3 | 80/20 | — |
| 10 | A-3 | PSO*3 | 20/80 | — |

Note
*1 polyethylene terephthalate (Mitsui PET J155 supplied by Mitsui Petrochemical Industries)
*2 polycarbonate (Panlite supplied by Teijin Kasei)
*3 polysulfone
*4 polyether-sulfone (VICTREX-5003P supplied by ICI)
*5 polyamide-imide ("Torlon" 4208 supplied by Amco)

TABLE 2

| Item | Unit | Example 2 | Example 3 | Example 4 |
|---|---|---|---|---|
| Specific gravity | — | 1.34 | 1.34 | 1.34 |
| Appearance of molded article | — | Good | Good | Good |
| Tensile strength | kg/cm$^2$ | 600 | 590 | 590 |
| Elongation at break | % | 3.7 | 3.5 | 3.6 |
| Flexural strength | kg/cm$^2$ | 1,220 | 1,220 | 1,220 |
| Flexural modulus | kg/cm$^2$ | 38,500 | 37,900 | 38,200 |
| Izod impact strength (non-notched) | kg · cm/cm$^2$ | 22 | 23 | 22 |
| Water absorption | % | 0.02 | 0.02 | 0.02 |

TABLE 3

| Item | Unit | Example 5 | Example 6 | Example 7 | Example 8 | Comparative Example 1 | Comparative Example 2 | Comparative Example 3 |
|---|---|---|---|---|---|---|---|---|
| Specific gravity | — | 1.28 | 1.24 | 1.20 | 1.64 | 1.28 | 1.24 | 1.20 |
| Appearance of molded article | — | Good | Good | Good | Good | Bad | Bad | Bad |
| Tensile strength | kg/cm$^2$ | 920 | 840 | 780 | 1,950 | 630 | 610 | 610 |
| Elongation at break | % | 3.5 | 5.0 | 7.2 | 4.3 | 2.3 | 3.0 | 4.0 |
| Flexural strength | kg/cm$^2$ | 1,300 | 1,280 | 1,260 | 2,850 | 980 | 1,000 | 1,030 |
| Flexural modulus | kg/cm$^2$ | 35,000 | 33,000 | 32,000 | 123,000 | 35,000 | 33,000 | 31,000 |
| Izod impact strength (non-notched) | kg·cm/cm$^2$ | 20 | 28 | 38 | 45 | 7 | 10 | 12 |
| Water absorption | % | 0.10 | 0.18 | 0.30 | 0.08 | 0.11 | 0.18 | 0.32 |

TABLE 4

| Item | Unit | Example 9 | Example 10 | Example 11 | Comparative Example 4 | Comparative Example 5 | Comparative Example 6 |
|---|---|---|---|---|---|---|---|
| Specific gravity | — | 1.67 | 1.67 | 1.67 | 1.67 | 1.67 | 1.67 |
| Appearance of molded article | — | Good | Good | Good | Good | Good | Good |
| Tensile strength | kg/cm$^2$ | 1,850 | 1,700 | 1,750 | 1,650 | 1,550 | 1,600 |
| Elongation at break | % | 3.7 | 3.2 | 3.3 | 3.4 | 2.9 | 2.8 |
| Flexural strength | kg/cm$^2$ | 2,600 | 2,400 | 2,450 | 2,000 | 1,900 | 2,150 |
| Flexural modulus | kg/cm$^2$ | 131,000 | 131,000 | 130,000 | 131,000 | 130,000 | 130,000 |
| Izod impact strength (non-notched) | kg·cm/cm$^2$ | 45 | 35 | 45 | 25 | 20 | 26 |
| Water absorption | % | 0.02 | 0.03 | 0.04 | 0.02 | 0.03 | 0.05 |

TABLE 5

| Item | Unit | Example 12 | Example 13 | Comparative Example 7 | Comparative Example 8 | Example 14 | Example 15 | Comparative Example 9 | Comparative Example 10 |
|---|---|---|---|---|---|---|---|---|---|
| Specific gravity | — | 1.30 | 1.24 | 1.30 | 1.24 | 1.32 | 1.26 | 1.32 | 1.26 |
| Appearance of molded article | — | Good | Good | Bad | Bad | Good | Good | Bad | Bad |
| Tensile strength | kg/cm$^2$ | 450 | 420 | 340 | 360 | 900 | 750 | 550 | 580 |
| Elongation at break | % | 3.3 | 5.0 | 1.8 | 2.8 | 10.5 | 10.0 | 2.9 | 3.3 |
| Flexural strength | kg/cm$^2$ | 750 | 650 | 650 | 600 | 1,370 | 1,420 | 860 | 1,020 |
| Flexural modulus | kg/cm$^2$ | 33,000 | 28,000 | 32,000 | 25,000 | 35,000 | 27,000 | 31,000 | 27,000 |
| Izod impact strength (non-notched) | kg·cm/cm$^2$ | 4 | 7 | 2 | 2 | 6 | 8 | 2 | 4 |
| Water absorption | % | 0.04 | 0.06 | 0.04 | 0.06 | 0.03 | 0.05 | 0.03 | 0.06 |

TABLE 6

| Item | Unit | Example 16 | Example 17 | Example 18 | Example 19 |
|---|---|---|---|---|---|
| Specific gravity | — | 1.35 | 1.36 | 1.35 | 1.37 |
| Appearance of molded article | — | Good | Good | Good | Good |
| Tensile strength | kg/cm$^2$ | 830 | 900 | 850 | 950 |
| Elongation at break | % | 10.0 | 3.2 | 3.1 | 4.5 |
| Flexural strength | kg/cm$^2$ | 1,400 | 1,460 | 1,300 | 1,450 |
| Flexural modulus | kg/cm$^2$ | 33,000 | 29,000 | 35,000 | 40,000 |

TABLE 6-continued

| Item | Unit | Example 16 | Example 17 | Example 18 | Example 19 |
|---|---|---|---|---|---|
| Izod impact strength (non-notched) | kg · cm/cm$^2$ | 30 | 60 | 4 | 7 |
| Water absorption | % | 0.03 | 0.05 | 0.08 | 0.15 |

We claim:

1. A polyphenylene sulfide resin composition consisting essentially of (a) 99 to 1 parts by weight of a modified polyphenylene sulfide resin obtained by reacting a polyphenylene sulfide resin with 0.03 to 30% by weight, based on the polyphenylene sulfide resin, of at least one carboxylic acid anhydride selected from the group consisting of maleic, itaconic and succinic anhydrides, and (b) 1 to 99 parts by weight of a polyamide resin, both resins (a) and (b) being melt-kneaded together.

2. A polyphenylene sulfide resin composition as set forth in claim 1, wherein the polyphenylene sulfide resin is a substantially linear polyphenylene sulfide resin.

3. A polyphenylene sulfide resin composition as set forth in claim 1, wherein the polyamide resin is at least one polyamide resin selected from the group consisting of nylon 6, nylon 66, nylon 610, nylon 612, nylon 11, nylon 12, and copolymers composed mainly of said polyamides.

4. A polyphenylene sulfide resin composition as set forth in claim 1, wherein the modified polyphenylene sulfide/polyamide resin weight ratio is in the range of from 90/10 to 10/90.

5. A polyphenylene sulfide resin composition as set forth in claim 1, further comprising an additive selected from the group consisting of an anti-oxidant, a heat stabilizer, a lubricant, a crystal nucleating agent, an ultraviolet inhibiter, a colorant, a flame retardant, a crosslinking promoter, a crosslinking inhibiter, and a reinforcing agent selected from the group consisting of glass fiber, alumina fiber, silicon carbide fiber, ceramic fiber, asbestos fiber, gypsum fiber, metal fiber, carbon fiber, wollastonite, sericite, kaolin, mica, clay, bentonite, asbestos, talc, alumina silicate, alumina, magnesium oxide, zirconiumoxide, titanium oxide, calcium carbonate, magnesium carbonate, dolomite, calcium sulfate, barium sulfate, glass bead, boron nitride, and silicon carbide.

6. A polyphenylene sulfide resin composition comprising 99 to 1 parts by weight of a blendable polyphenylene sulfide resin which is obtained by reacting a polyphenylene sulfide resin with 0.03 to 30% by weight, based on the polyphenylene sulfide resin, of at least one carboxylic acid anhydride selected from the group consisting of maleic, itaconic and succinic anhydrides, and 1 to 99 parts by weight of at least one polyamide resin; both resins being melt-kneaded together, wherein said blendable polyphenylene sulfide resin has a melt viscosity of 100 to 10,000 poises measured at a temperature of 320° C. and a shear rate of 10 sec$^{-1}$ exhibits vC=O at 1,700 to 1,800 cm$^{-1}$ in IR spectroscopy and comprises at least 70 mole % of repeating units represented by the structural formula

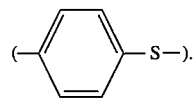

7. A polyphenylene sulfide resin composition consisting essentially of 99 to 1 parts by weight of a blendable polyphenylene sulfide resin which can be obtained by reacting a polyphenylene sulfide resin with 0.03 to 30% by weight, based on the polyphenylene sulfide resin, of at least one carboxylic acid anhydride selected from the group consisting of maleic, itaconic and succinic anhydrides, and 1 to 99 parts by weight of a polyamide resin, both resins being melt-kneaded together, wherein said blendable polyphenylene sulfide resin a) has a melt viscosity of 100 to 10,000 poise measured at a temperature of 320° C. and a shear rate of 10 sec$^{-1}$, b) exhibits vC=O at 1,700 to 1,800 cm$^{-1}$ in IR spectroscopy and c) comprises at least 70 mole % of repeating units represented by the structural formula

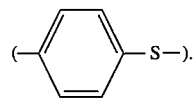

* * * * *

UNITED STATES PATENT AND TRADEMARK OFFICE
CERTIFICATE OF CORRECTION

PATENT NO. : 5,488,084  
DATED : January 30, 1996  
INVENTOR(S) : Sho Kadoi et al Page 1 of 2

It is certified that error appears in the above-indentified patent and that said Letters Patent is hereby corrected as shown below:

In Column 9, line 21, please change "$CH_3$" to --$CF_3$--;

line 24, please change "$CH_3$" to --$CF_3$--; and line 36, please change the second occurrence of "$CH_3$" to --Cl--.

In Column 10, at about line 55, at the very end of the line, please change "$N\}$" to --$N\}_n$--.

In Column 16, in "TABLE 1-continued", under the subheading, "Additive", second row, please change "N-66 50/50" to --N-66--; under the subheading "PPS/additive ratio (%)", second row, please change the dash to --50/50--; under the subheading "Modified PPS", second row, please insert a dash; and

UNITED STATES PATENT AND TRADEMARK OFFICE
CERTIFICATE OF CORRECTION

PATENT NO. : 5,488,084
DATED : January 30, 1996
INVENTOR(S) : Sho Kadoi et al

It is certified that error appears in the above-indentified patent and that said Letters Patent is hereby corrected as shown below:

in "TABLE 2", under the subheading "Example 4", fifth row, please change "1,220" to --1,200--.

Signed and Sealed this

Twenty-third Day of April, 1996

Attest:

BRUCE LEHMAN

*Attesting Officer*   *Commissioner of Patents and Trademarks*